US008089743B2

(12) United States Patent
Jian

(10) Patent No.: US 8,089,743 B2
(45) **Date of Patent: *Jan. 3, 2012**

(54) VOLTAGE REGULATOR HAVING ACTIVE FOLDBACK CURRENT LIMITING CIRCUIT

(75) Inventor: Ming-Hong Jian, Hsinchu (TW)

(73) Assignee: Holtek Semiconductor Inc., Hsinchu (TW)

( * ) Notice: Subject to any disclaimer, the term of this patent is extended or adjusted under 35 U.S.C. 154(b) by 518 days.

This patent is subject to a terminal disclaimer.

(21) Appl. No.: 12/276,727

(22) Filed: Nov. 24, 2008

(65) Prior Publication Data

US 2010/0090664 A1 Apr. 15, 2010

(30) Foreign Application Priority Data

Oct. 13, 2008 (TW) .............................. 97139133 A

(51) Int. Cl.
*H02H 7/00* (2006.01)

(52) U.S. Cl. ...................................... 361/93.9; 323/274

(58) Field of Classification Search .......... 323/271–277, 323/280, 281, 207, 282, 286; 361/18, 93.09; 363/16–20, 89, 98
See application file for complete search history.

(56) References Cited

U.S. PATENT DOCUMENTS 6,522,111 B2 * 2/2003 Zadeh et al. .................. 323/277
7,183,755 B2 * 2/2007 Itoh et al. ...................... 323/274

* cited by examiner

*Primary Examiner* — Rajnikant Patel
(74) *Attorney, Agent, or Firm* — WPAT, P.C.; Justin King

(57) ABSTRACT

The present invention mainly relates to a voltage regulator, comprising: a P typed power MOS; a feedback circuit; a differential amplifier; a protecting circuit having a N-typed transistor current mirror; and an active foldback current limiting circuit rather than using a resistor. When the P typed power MOS is under short circuit current situation, the current at the output side of the current mirror is increased in order to limit the current flown through the power MOS. Meanwhile, the same purpose can also be served by increasing the current at the input side of the DC current mirror.

16 Claims, 8 Drawing Sheets

VOLTAGE REGULATOR HAVING ACTIVE FOLDBACK CURRENT LIMITING CIRCUIT

BACKGROUND OF THE INVENTION

1. Field of the Invention

The present invention relates to a foldback limiting circuit and a power regulator using the same, more particularly to, a voltage regulator having an active foldback current limiting circuit.

2. Description of the Prior Arts

Refer to FIG. 1 and FIG. 2, which illustrate the conventional approaches.

Generally speaking, during the application of DC voltage regulator (power regulator), there are always some protection circuits, which can be categorized by an over voltage protection, an over temperature protection, and a short circuit protection. As the short circuit protection is concerned, a foldback current limiting circuit can realize the same. The mechanism for the foldback current limitation, in the most of occasions, is to take advantage of piece-wisely changing the size of detecting current so as to achieve a relatively smaller limiting current.

The disclosures illustrated in FIG. 1 and FIG. 2, are the prior arts for the foldback current limiting circuit. In FIG. 1, a transistor $M_{102}$ is used to sense a current flowing through a power transistor $M_{101}$, at the time for the case of over current, a voltage drop across $R_{S101}$ is adequate to turn on a transistor $M_{105}$ so as to generate a charging current to clamp the gate voltage $V_{EO1}$ and the initial purpose of current limiting can be achieved.

A transistor $M_{106}$ and a resistor $R_{S102}$ illustrated in FIG. 1 are a part of the foldback current limiting circuit, which serve the purpose of short-circuited current protection. While a short circuit situation happening at the output voltage side, said $M_{106}$ will be turned off and the current flowing through $R_{S101}$ will be increasing, therefore, the charging current for said $M_{105}$ is also increasing accordingly such that the gate voltage of said $M_{101}$ will be clamped at an even higher voltage reference so as to limit the short circuit at a lower state.

As suggested by FIG. 2, while a transistor $M_{202}$ detects the over current situation for a power transistor $M_{201}$, a voltage drop across a resistor $R_{203}$ is adequate to turn on a transistor $M_{220}$ and further take advantage of a resistor $R_{205}$ to convert the current flowing through a transistor $M_{222}$ into a voltage and further turn on a transistor $M_{203}$ to generate a charging current to clamp the gate voltage of $M_{201}$ so as to achieve the initial purpose of current limiting as FIG. 1 suggests.

However, said $R_{S101}$, $R_{203}$, and $R_{205}$ in FIG. 1 and FIG. 2, as well as said $M_{220}$ in FIG. 2 are vulnerable to process and temperature variation and influencing directly the accuracy of short circuit limiting current. Additionally, since in both of the prior arts the resistors are inevitable, if willing to limit the current at a lower value, the corresponding resistance must be increased. In the disclosure of FIG. 1, the turning-on impedance introduced by the transistor $M_{106}$ needs to be further considered, that is to say, if said impedance is exceedingly large, then the normal operation of the voltage regulator cannot function properly. To sum up, to enhance the accuracy for diversified process and temperature variation, and the usage of the area efficiency for die area, are both the topics of the present invention.

Accordingly, in view of the above drawbacks, it is an imperative that a foldback current limiting circuit, especially an active foldback current limiting circuit for a power regulator is designed so as to solve the drawbacks as the foregoing.

SUMMARY OF THE INVENTION

In view of the disadvantages of prior art, the primary object of the present invention relates to a power regulator, taking advantage of an active foldback current limiting circuit so as to achieve the purpose of highly accurate voltage detection.

Preferably, said power regulator, comprises:

a P-typed power transistor, its source receives an unregulated first voltage source and generates a regulated second voltage at drain according to a control signal;

a feedback circuit, for generating a feedback signal via the division to said second voltage;

a differential operation amplifier, its output is coupled to a gate of said power transistor, its positive input terminal is coupled to said feedback signal, and its negative input terminal is coupled to a reference voltage;

a protecting circuit, said protecting circuit is configured so as to limit a first current flowing through said power transistor, and when said first current exceeds a predetermined value, a voltage of said gate of said power transistor is enhanced higher; wherein, said protecting circuit further comprises a first DC current mirror, said first DC current mirror further comprises a pair of N transistors, for which gates of said N transistors are interconnected together, and for one of the pair its gate and drain are interconnected as an input terminal, and a drain of another N transistors is defined as output terminal; and an active foldback current limiting circuit, for limiting the first current flowing through said P-typed power transistor, and when a short circuit current is happening to said P-typed power transistor, a current at the DC current mirror's output terminal is increased.

Preferably, said power regulator, comprises:

a P-typed power transistor, its source receives an unregulated first voltage source and generates a regulated second voltage at drain according to a control signal;

a feedback circuit, for generating a feedback signal via the division to said second voltage;

a differential operation amplifier, its output is coupled to a gate of said power transistor, its positive input terminal is coupled to said feedback signal, and its negative input terminal is coupled to a reference voltage;

a protecting circuit, said protecting circuit is configured so as to limit a first current flowing through said power transistor, and when said first current exceeds a predetermined value, a voltage of said gate of said power transistor is enhanced higher; wherein, said protecting circuit further comprises a first DC current mirror, said first DC current mirror further comprises a pair of N transistors, for which gates of said N transistors are interconnected together, and for one of the pair its gate and drain are interconnected as an input terminal, and a drain of another N transistors is defined as output terminal; and an active foldback current limiting circuit, for limiting the first current flowing through said P-typed power transistor, and when a short circuit current is happening to said P-typed power transistor, a current at the DC current mirror's output terminal is increased.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the elements described. For your esteemed members of reviewing committee to further understand and recognize the fulfilled functions and structural characteristics of the invention, several exemplary embodiments cooperating with detailed description are presented as the follows.

In order to avoid the occurrence of the short circuit current, the present invention provides an active foldback current limiting circuit (AFCLC), to limit the short circuit current at an extremely low state and lower the present power dissipation from the package damage.

Figure 1:
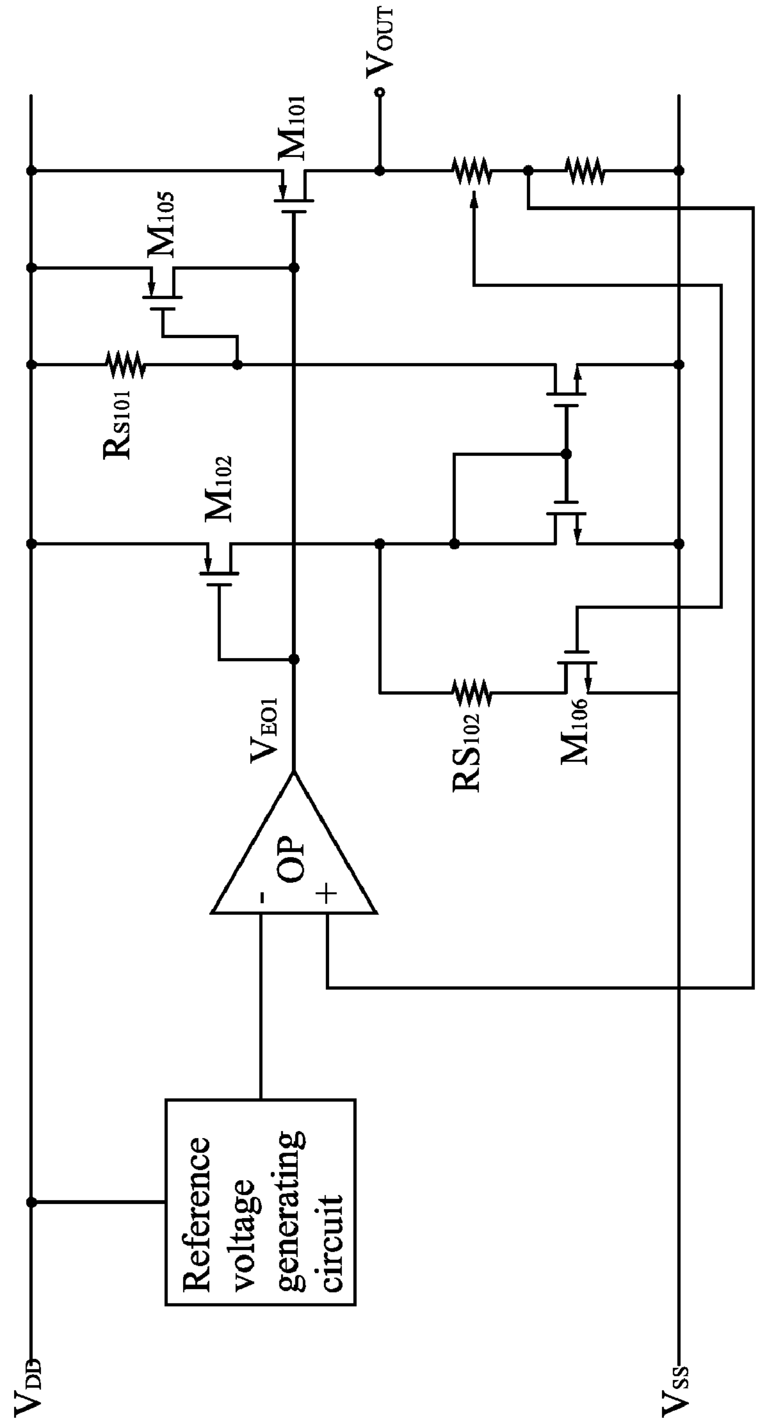
FIG.1 (Prior Art)
FIG. 1 relates a block diagram according to a prior art.
Figure 2:
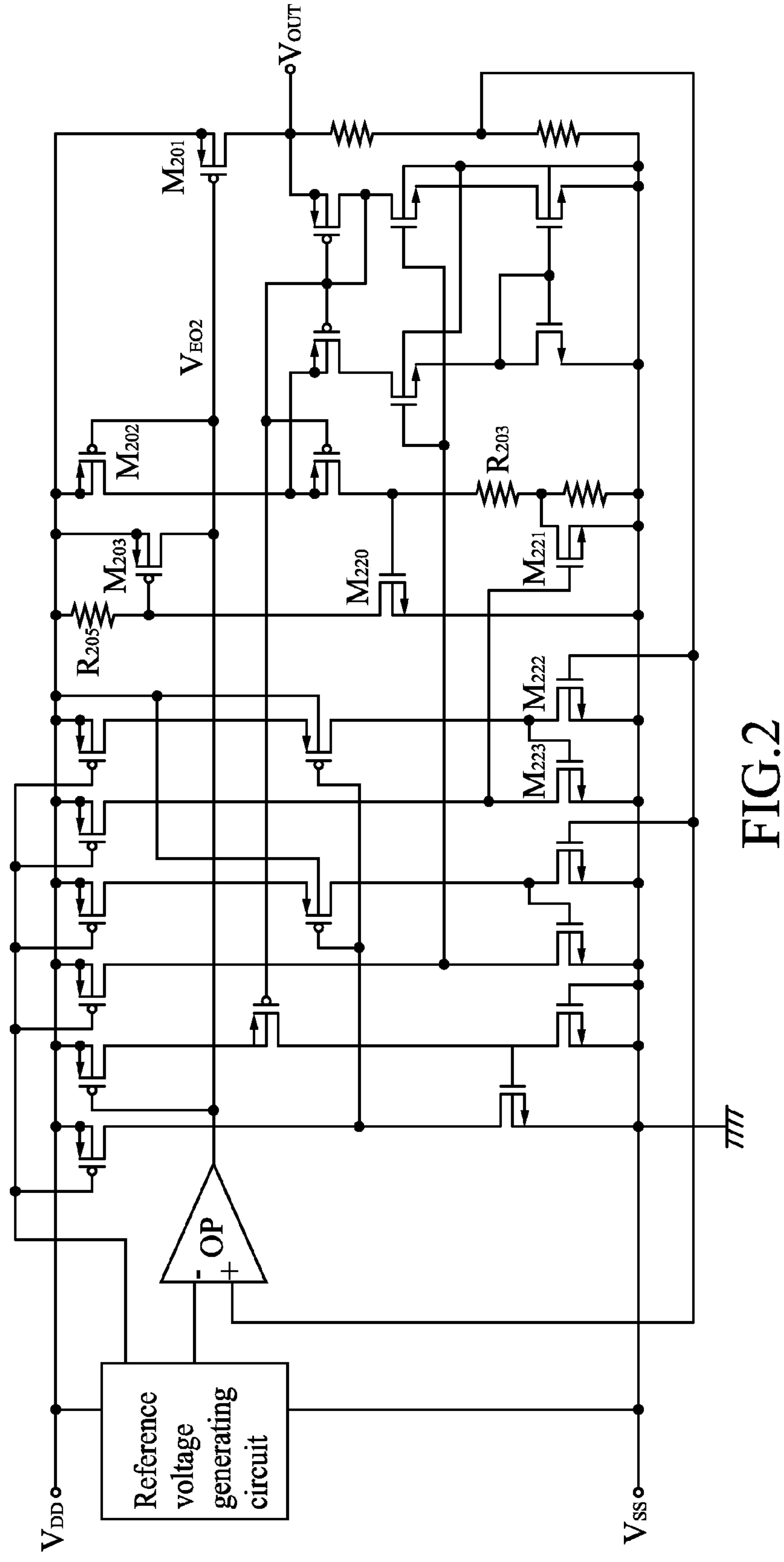
FIG.2 (Prior Art)
FIG. 2 relates another block diagram according to a prior art.
Figure 3:
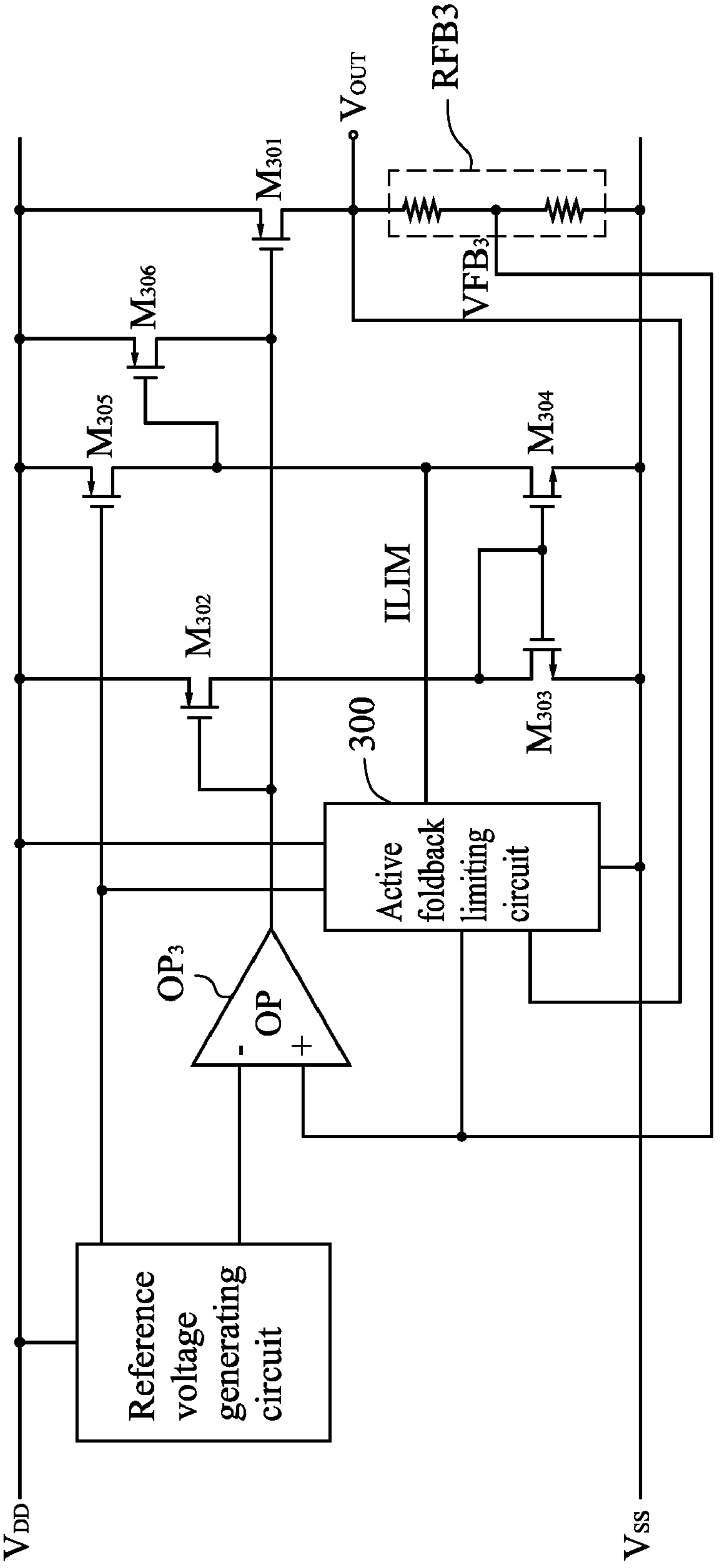
FIG. 3 relates to a block diagram in accordance with the active foldback current limiting circuit of the present invention.

FIG. 3 relates to a diagram for an active foldback current limiting circuit and a power regulator using the same, said power regulator comprises: a P-typed power transistor $M_{301}$; a feedback circuit RFB3; a differential op amplifier OP3; a protecting circuit (comprising $M_{302}$, $M_{305}$, and $M_{306}$) with a N-typed current mirror (Comprising $M_{303}$ and $M_{304}$); and an active foldback current limiting circuit 300 being devoid of a resistor, for limiting the current flowing through said $M_{301}$, and while the short circuit current happening to said $M_{301}$, for increasing the current of said $M_{304}$ of the output terminal of said DC current mirror in said protecting circuit.

Figure 4:
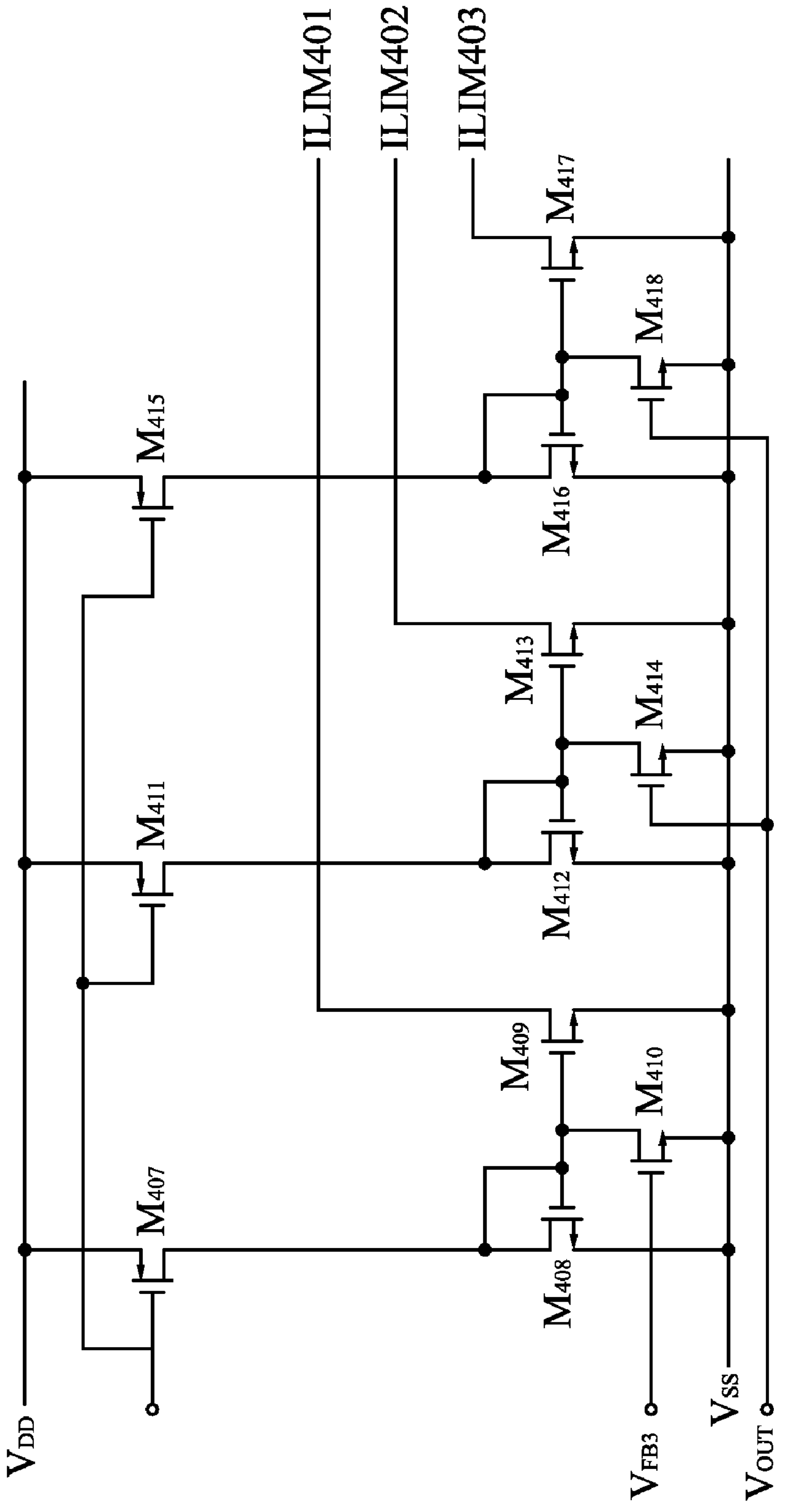
FIG. 4 and FIG. 5 relate to circuit diagrams in accordance with the active foldback current limiting circuit of the present invention.

FIG. 4 relates to a N-1 typed active foldback current limiting circuit, which can be applied to the circuit 300 in FIG. 3. A foldback mechanism is composed of Transistors $M_{407}$~$M_{418}$, wherein said transistors $M_{407}$, $M_{411}$, and $M_{415}$ are constant current sources, transistors $M_{409}$, $M_{413}$, and $M_{417}$ are determining the size of short circuit current, meanwhile, the gate of said $M_{410}$ is coupled to a feedback voltage VFB3, the gates of said $M_{414}$ and $M_{418}$ are coupled to the output terminal of the power regulator, and output signals $I_{LIM401}$~$I_{LIM403}$ are connected to the gate of said $M_{306}$ in FIG. 3. How these transistors function is described as follows: The initial current limiting action is, when over current situation happens to the output loading current, said $M_{306}$ is turned on to generate a charging current to clamp the gate voltage of $M_{301}$ so as to complete the initial current limiting ($I_{LIM400}$), meanwhile, transistors $M_{410}$, $M_{414}$, and $M_{418}$ are all turned on. As the output loading current increases, the output voltage decreases and correspondingly the feedback voltage VFB3 decreases. As soon as VFB3 decreases to be below the threshold of the transistor $M_{410}$, said $M_{410}$ is turned off to enable said transistor $M_{409}$ to discharge the gate of said transistor $M_{306}$, hence the gate of said power transistor $M_{301}$ is clamped at an even higher voltage reference so as to achieve the first phase of foldback current limiting ($I_{LIM401}$). In a similar manner, as the output loading current keeps on increasing, and the output voltage keeps on decreasing, as long as the threshold voltage for transistors $M_{414}$ and $M_{418}$ are properly assigned, that is, the minimum threshold voltage for $M_{414}$ is set to be higher than that of $M_{418}$, therefore, the transistor $M_{414}$ will be turned off first, and then the transistor $M_{413}$ will enhance the discharging current for the transistor $M_{306}$. Hence, the gate voltage of the power transistor $M_{301}$ is clamped at an even higher voltage reference than that at the first phase, then the second phase of foldback current limiting ($I_{LIM402}$) is achieved. Finally, as the loading current increases as much as suitable for the output voltage to turn off the transistor $M_{418}$, at this moment the transistor $M_{417}$ is again increasing the discharging current for the gate of the transistor $M_{306}$ then the third phase of foldback current limiting ($I_{LIM403}$) is achieved.

Figure 5:
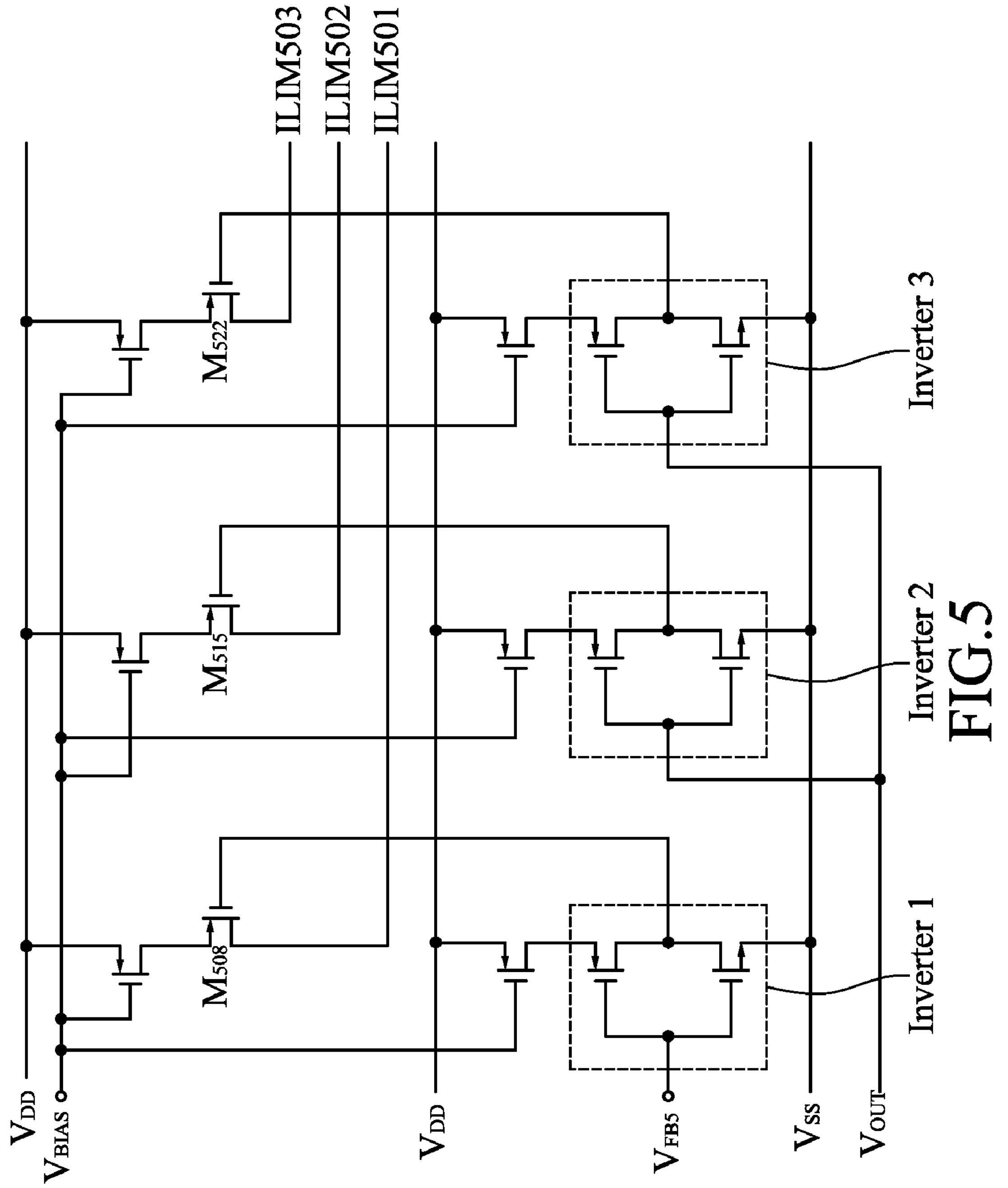

In a similar manner, FIG. 5 relates to a P-2 typed active foldback current limiting circuit, which can also be applied to said circuit 300 in FIG. 3. When the initial current limiting process occurs, all transistors, $M_{508}$, $M_{515}$, and $M_{522}$ are turned on. At the time of the activation of piecewise foldback mechanism, the transistors $M_{508}$, $M_{515}$, and $M_{522}$ will be turned off in sequence, in such a way, the gate voltage of the power transistor $M_{301}$ is clamped at an even higher voltage reference. Moreover, the P-2 typed active foldback current limiting circuit further comprises a plurality of inverters (For example, Inverter 1, Inverter 2 and Inverter 3). Sources of P-typed transistors in the inverters are supplied a current by said plurality of current sources.

Figure 6:
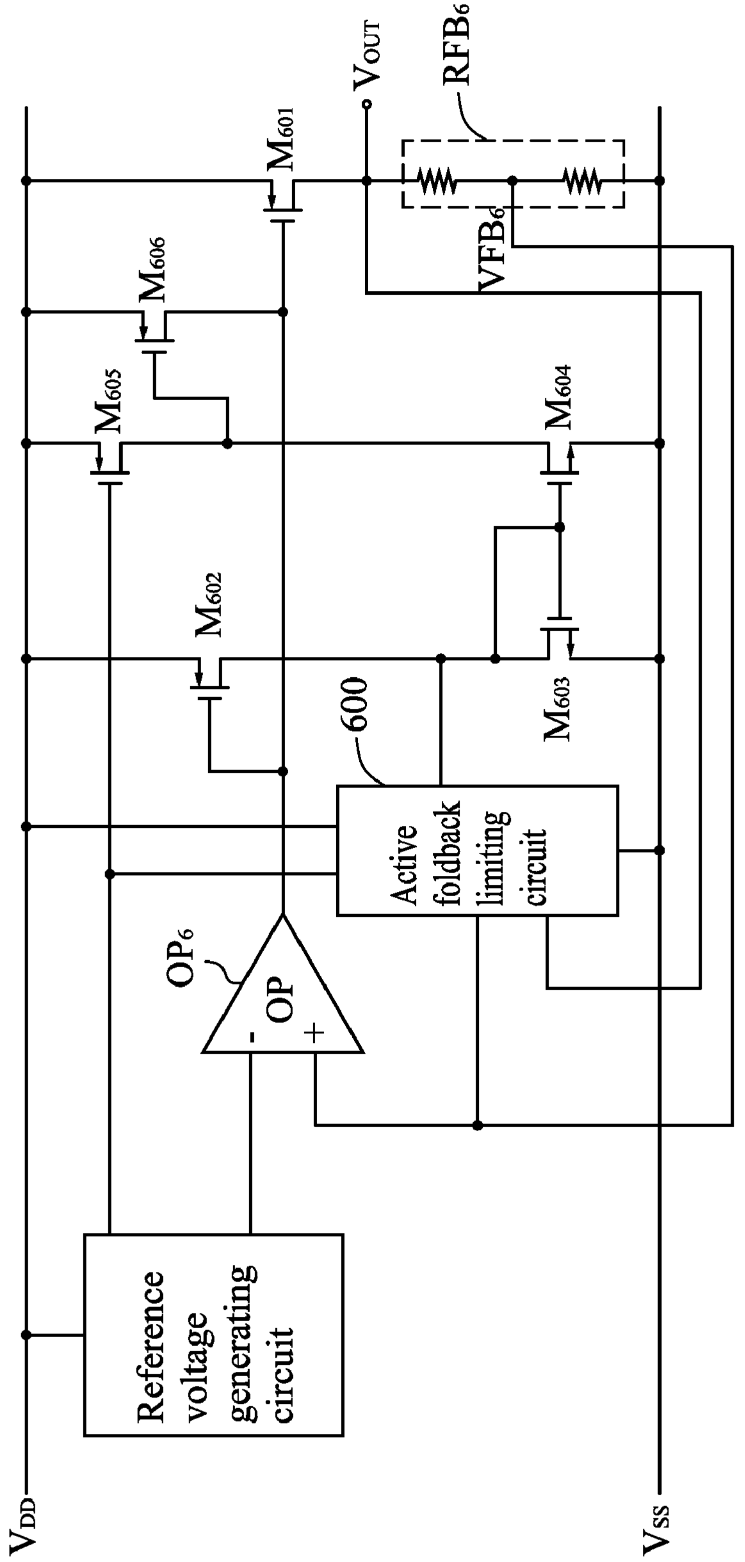
FIG. 6 relates to another block diagram in accordance with the active foldback current limiting circuit of the present invention.
Figure 7:
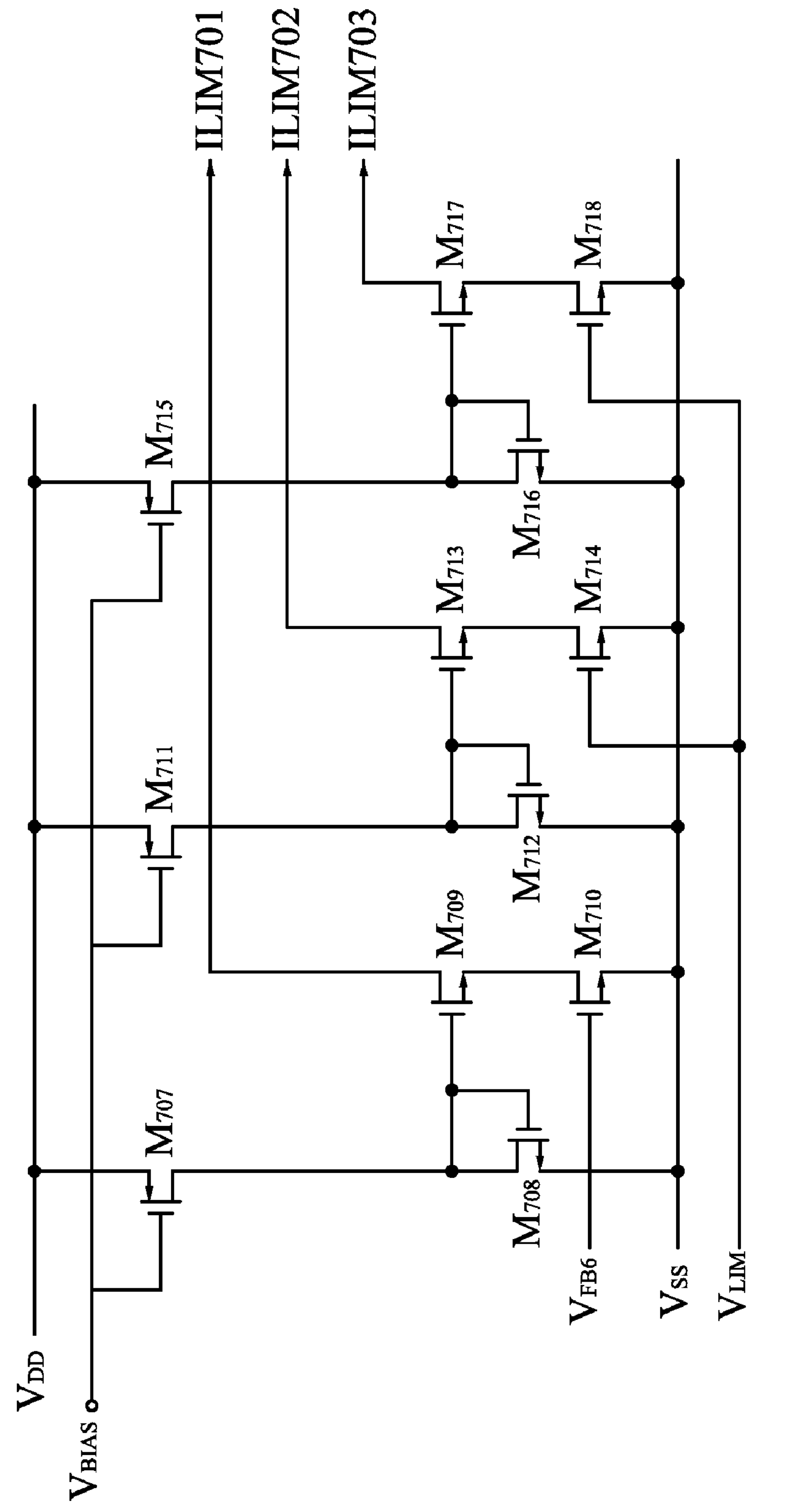
FIG. 7 and FIG. 8 relate to another circuit diagrams in accordance with the active foldback current limiting circuit of the present invention.

FIG. 6 relates to a diagram for an active foldback current limiting circuit and a power regulator using the same, said power regulator comprises: a P-typed power transistor $M_{601}$; a feedback circuit RFB6; a differential op amplifier OP6; a protecting circuit (comprising $M_{602}$, $M_{605}$, and $M_{606}$) with a N-typed current mirror (comprising $M_{603}$ and $M_{604}$); and an active foldback current limiting circuit 600 being devoid of a resistor, for limiting the current flowing through said $M_{601}$, and when a short circuit current happening to said $M_{601}$, for increasing the current of said $M_{604}$ of the output terminal of said DC current mirror in said protecting circuit.

The difference between the disclosure of FIG. 3 and that of FIG. 6 is, said circuit 300 is coupled to the output terminal of said DC current mirror and said circuit 600 is coupled to the input terminal of said DC current mirror respectively.

FIG. 4 relates to a N-2 typed active foldback current limiting circuit, which can be applied to the circuit 600 in FIG. 6. A foldback mechanism is composed of Transistors $M_{707}$~$M_{718}$, wherein transistors $M_{707}$, $M_{711}$, and $M_{715}$ are constant current sources, transistors $M_{709}$, $M_{713}$, and $M_{717}$ are for determining the size of short circuit current, meanwhile, the gate of said $M_{710}$ is coupled to a feedback voltage VFB6, the gates of said $M_{714}$ and $M_{718}$ are coupled to the output terminal of the power regulator, and output signals $I_{LIM701}$~$I_{LIM703}$ are connected to the drains of said $M_{602}$ and $M_{603}$ in FIG. 6.

How these transistors function is described as follows: The initial current limiting action is the same with the disclosure of FIG. 6, when over current situation happens to the output loading current, said $M_{606}$ is turned on to generate a charging current to clamp the gate voltage of said $M_{601}$ so as to complete the initial current limiting ($I_{LIM700}$), meanwhile, transistors $M_{710}$, $M_{714}$, and $M_{718}$ are all turned on. As the output loading current increases, the output voltage decreases and correspondingly the feedback voltage $V_{FB6}$ decreases. As soon as said $V_{FB6}$ decreases to be under the threshold of the transistor $M_{710}$, at this time the current flowing through $M_{603}$ increases from original $I_2-(I_9+I_{13}+I_{17})$ to be $I_2-(I_{13}+I_{17})$ such that the gate voltage of the transistor $M_{606}$ decreases even more and the charging current for the power transistor $M_{601}$ is increasing, hence the gate of said power transistor $M_{601}$ is clamped at an even higher voltage reference so as to achieve the first phase of foldback current limiting ($I_{LIM701}$). In the similar manner, as the output loading current keeps on increasing, and the output voltage keeps on decreasing, as long as the threshold voltage for transistors $M_{714}$ and $M_{718}$ are properly assigned, that is, the minimum threshold voltage for $M_{714}$ is set to be higher than that of $M_{718}$, therefore, the transistor $M_{714}$ will be turned off first, and then the transistor $M_{413}$ will enhance the discharging current for the transistor $M_{306}$, from $I_2'-(I_{13}+I_{17})$ at the first phase to be $I_2'-I_{17}$ and the charging current for the gate of the power transistor $M_{601}$ is further increased, therefore, the second foldback current limiting ($I_{LIM702}$) is achieved. Finally, the loading current further increases such that the output voltage is adequate to turn off $M_{718}$, at this time the current flowing through the transistor $M_{603}$ is $I_2''$ and correspondingly the charging current for the gate of said $M_{601}$ is increased again then the foldback current limiting ($I_{LIM702}$) at the third phase is achieved. Since the current $I_2''$ determines the foldback limiting at the third phase, the possible error for the foldback limiting is merely determined by $I_2''$. Thus, as long as the current detected by the transistor $M_{602}$ is adequately accurate, then the error introduced by the foldback limiting current will be greatly reduced.

Figure 8:
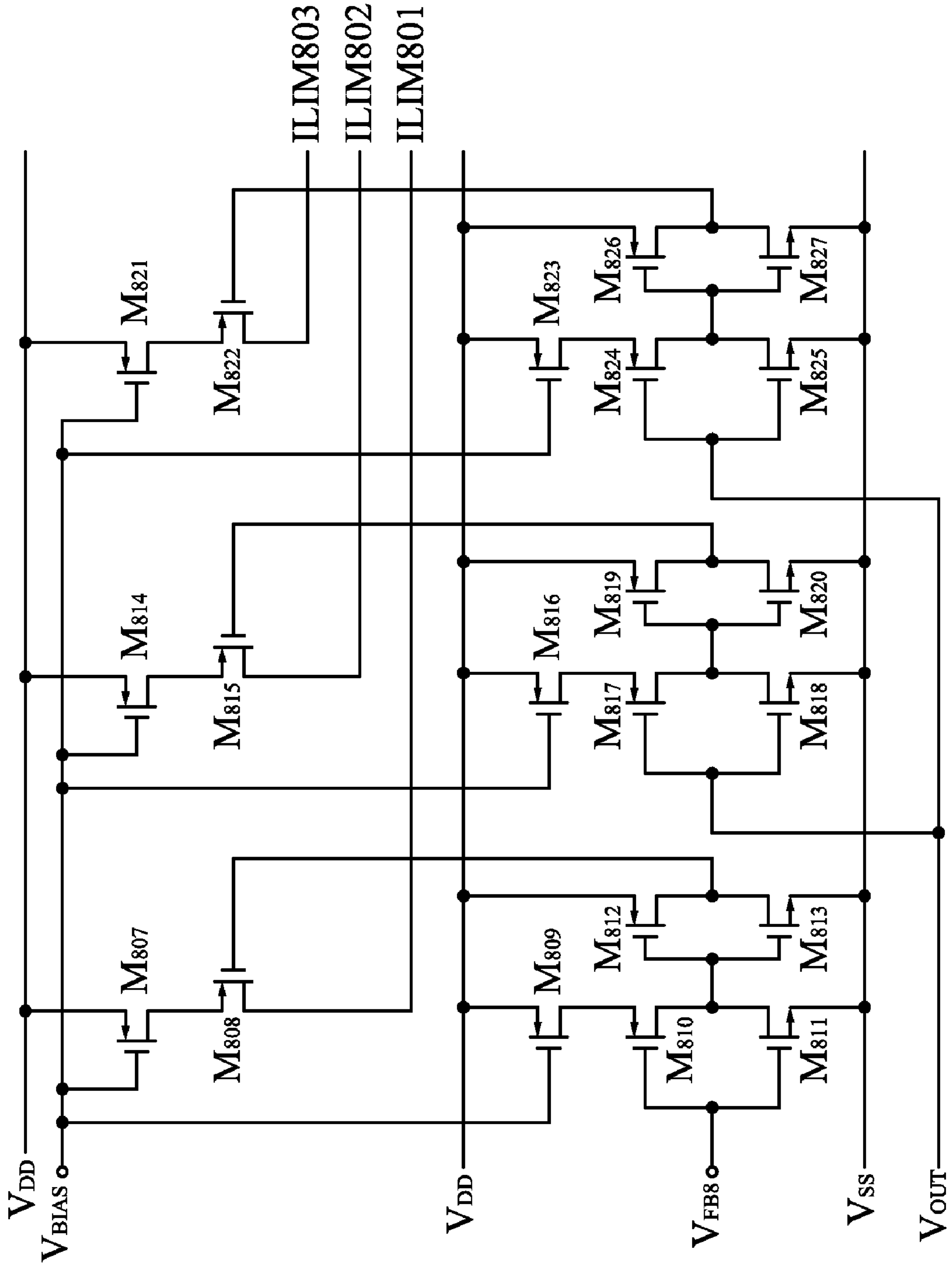

In a similar manner, FIG. 8 relates to a P-1 type active foldback current limiting circuit diagram, and how these transistors function is described as follows: a foldback mechanism is composed of transistors $M_{807\sim827}$, wherein transistors $M_{807}$, $M_{814}$, $M_{821}$ $M_{809}$, $M_{816}$, and $M_{823}$ are constant current sources, and drains of $M_{812/813}$, $M_{819/820}$, $M_{826/827}$ are respectively coupled to gates of $M_{808}$, $M_{815}$, and $M_{822}$, and gates of transistors $M_{810/811}$ are coupled to the feedback voltage $V_{FB6}$. Gates of $M_{817/818}$, and gates of $M_{824/825}$ are coupled to the output terminal of the voltage regulator, and output signals $I_{LIM801\sim803}$ are coupled to the drains of transistors $M_{602}$ and $M_{603}$. The initial current limiting action illustrated in FIG. 3 is identical to that in FIG. 6, when there exists an over current for the output loading current to turn on said $M_{606}$, a charging current is generated to clamp the gate voltage of said $M_{601}$ so as to complete the initial current limiting ($I_{LIM800}$), at this time the transistors $M_{608}$, $M_{615}$, $M_{622}$ are all turned off. When an over current situation occurs, i.e., the feedback voltage $V_{FB6}$ is lower than the threshold of the transistor $M_{811}$, a voltage at drains of said $M_{812/813}$ shall be zero, so the transistor $M_{808}$ turns on, and a charging current is provided to complete foldback current limiting ($I_{LIM801}$) at the first phase. And when such a action can be taken repeatedly, an active foldback current limiting can be achieved.

The four types of active foldback current limiting circuits disclosed in the present invention can be also mutually or simultaneously applied to the same power regulator, which is well known by the person skilled in the art hence the repeated information will be omitted.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power regulator, comprising:

a P-typed power transistor, its source receiving an unregulated first voltage source and generating a regulated second voltage at drain according to a control signal;

a feedback circuit, for generating a feedback signal via the division to said second voltage;

a differential operation amplifier, its output is coupled to a gate of said power transistor, its positive input terminal is coupled to said feedback signal, and its negative input terminal is coupled to a reference voltage;

a protecting circuit, for being configured so as to limit a first current flowing through said power transistor, and when said first current exceeds a predetermined value, a voltage of said gate of said power transistor is enhanced higher; wherein, said protecting circuit further comprises a first DC current mirror, said first DC current mirror further comprises a pair of N transistor, for which gates of said N transistors are interconnected together, and for one of the pair its gate and drain are interconnected as an input terminal, and a drain of another N transistors is defined as output terminal; and an active foldback current limiting circuit, for limiting the first current flowing through said P-typed power transistor, and when a short circuit current is happening to said P-typed power transistor, a current at the DC current mirror's output terminal is increased;

wherein said active foldback current limiting circuit further comprising:

a plurality of current sources, being composed of P-typed transistors;

a plurality of inverters, sources of P-typed transistors in the inverters are supplied a current by said plurality of current sources; and a plurality of P-typed transistor switches, for controlling whether said plurality of P-typed current sources supply currents to said first DC current mirrors' output, and gates of said plurality of P-typed current sources are coupled to outputs of said inverters; wherein, outputs of said plurality of P-typed current sources are coupled to said first DC current mirrors' outputs.

2. The voltage regulator as recited in claim 1, wherein said active foldback current limiting circuit further comprising:

a plurality of current sources, being composed of P-typed transistors;

a plurality of N-typed transistor current mirrors, inputs of said plurality of N-typed current mirrors are coupled to said plurality of current sources respectively and outputs of said plurality of N-typed current mirrors are coupled to said first DC current mirror's output; and a plurality of N-typed switches, for controlling whether said plurality of N-typed transistor current mirrors turn on.

3. The voltage regulator as recited in claim 2, wherein one of said plurality of N-typed switches in the active foldback current limiting circuit is coupled to a drain of said P-typed power transistor.

4. The voltage regulator as recited in claim 2, wherein another one of said plurality of N-typed switches in the active foldback current limiting circuit is coupled to said feedback circuit's output.

5. The voltage regulator as recited in claim 2, wherein a threshold voltage of said plurality of N-typed switches in the active foldback current limiting circuit is determined according to the demand for said second voltage and a short circuit current of said power transistor.

6. The voltage regulator as recited in claim 1, wherein an input of one of said plurality of inverters in the active foldback current limiting circuit is coupled to a drain of said P-typed power transistor.

7. The voltage regulator as recited in claim 1, wherein an input of another one of said plurality of inverters in the active foldback current limiting circuit is coupled to said feedback circuit's output.

8. The voltage regulator as recited in claim 1, wherein a threshold voltage of N-typed transistor within said plurality of inverters in the active foldback current limiting circuit is determined according to the demand for said second voltage and a short circuit current of said power transistor.

9. A power regulator, comprising:

a P-typed power transistor, its source receiving an unregulated first voltage source and generating a regulated second voltage at drain according to a control signal;

a feedback circuit, for generating a feedback signal via the division to said second voltage;

a differential operation amplifier, its output is coupled to a gate of said power transistor, its positive input terminal is coupled to said feedback signal, and its negative input terminal is coupled to a reference voltage;

a protecting circuit, for being configured so as to limit a first current flowing through said power transistor, and when said first current exceeds a predetermined value, a voltage of said gate of said power transistor is enhanced higher; wherein, said protecting circuit further comprises a first DC current mirror, said first DC current mirror further comprises a pair of N transistors, for which gates of said N transistors are interconnected together, and for one of the pair its gate and drain are interconnected as an input terminal, and a drain of another N transistors is defined as output terminal; and an active foldback current limiting circuit, for limiting the first current flowing through said P-typed power transistor, and when a short circuit current is happening to said P-typed power transistor, a current at the input terminal of the DC current mirror is increased;

wherein said active foldback current limiting circuit further comprising:

a plurality of current sources, being composed of P-typed transistors;

a plurality of first inverters, sources of P-typed transistors in the first inverters are supplied a current by said plurality of current sources;

a plurality of second inverters, outputs of said plurality of second inverters are respectively coupled to inputs of said first inverters; and a plurality of P-typed transistor switches, for controlling whether said plurality of P-typed current sources supply currents to said first DC current mirrors' output, and gates of said plurality of P-typed current sources are coupled to outputs of said inverters; wherein, outputs of said plurality of P-typed current sources are coupled to said first DC current mirrors' output.

10. The voltage regulator as recited in claim 9, wherein said active foldback current limiting circuit further comprising:

a plurality of current sources, being composed of P-typed transistors;

a plurality of N-typed transistor current mirrors, inputs of said plurality of N-typed current mirrors are coupled to said plurality of current sources respectively and outputs of said plurality of N-typed current mirrors are coupled to an output of said first DC current mirror; and a plurality of N-typed switches, for controlling whether sources of outputs of said plurality of N-typed current mirrors are coupled to a ground.

11. The voltage regulator as recited in claim 10, wherein one of said plurality of N-typed switches in the active foldback current limiting circuit is coupled to a drain of said P-typed power transistor.

12. The voltage regulator as recited in claim 10, wherein another one of said plurality of N-typed switches in the active foldback current limiting circuit is coupled to an output of said feedback circuit.

13. The voltage regulator as recited in claim 10, wherein a threshold voltage of said plurality of N-typed switches in the active foldback current limiting circuit is determined according to the demand for said second voltage and a short circuit current of said power transistor.

14. The voltage regulator as recited in claim 9, wherein an input of one of said plurality of first inverters in the active foldback current limiting circuit is coupled to a drain of said P-typed power transistor.

15. The voltage regulator as recited in claim 9, wherein an input of another one of said plurality of first inverters in the active foldback current limiting circuit is coupled to an output of said feedback circuit.

16. The voltage regulator as recited in claim 9, wherein a threshold voltage of N-typed transistor within said plurality of first inverters in the active foldback current limiting circuit is determined according to the demand for said second voltage and a short circuit current of said power transistor.

* * * * *